US012747256B2

(12) United States Patent
Tonomura et al.

(10) Patent No.: US 12,747,256 B2

(45) Date of Patent: Sep. 29, 2026

(54) METHOD FOR PRODUCING OXADISILACYCLOPENTANE COMPOUND

(71) Applicant: Shin-Etsu Chemical Co., Ltd., Tokyo (JP)

(72) Inventors: Yoichi Tonomura, Joetsu (JP); Takahiro Kojima, Joetsu (JP); Ayumu Kiyomori, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 497 days.

(21) Appl. No.: 18/563,193

(22) PCT Filed: May 2, 2022

(86) PCT No.: PCT/JP2022/019510

§ 371 (c)(1),
(2) Date: Nov. 21, 2023

(87) PCT Pub. No.: WO2022/249859

PCT Pub. Date: Dec. 1, 2022

(65) Prior Publication Data

US 2024/0279254 A1 Aug. 22, 2024

(30) Foreign Application Priority Data

May 26, 2021 (JP) ................................ 2021-088116

(51) Int. Cl.
*C07F 7/08* (2006.01)

(52) U.S. Cl.
CPC .................................. *C07F 7/0874* (2013.01)

(58) Field of Classification Search
CPC ............................... C07F 7/0874; C07F 7/089
See application file for complete search history.

(56) References Cited

U.S. PATENT DOCUMENTS 5,191,102 A * 3/1993 Oyama ................ C07F 7/0874 556/464
5,286,890 A 2/1994 Dougherty

FOREIGN PATENT DOCUMENTS

JP 5-25182 A 2/1993

OTHER PUBLICATIONS

Borisov et al., "Polydimethylsilalkylene-dimethylsiloxanes as advanced membrane materials for thermopervaporative recovery of oxygenates from aqueous reaction media", Petroleum Chemistry, 2016, vol. 56, No. 9, pp. 798-804.
International Search Report for PCT/JP2022/019510 (PCT/ISA/210) mailed on Jun. 28, 2022.
Pitt et al., "The Preparation, Isomerization, and Oxidation of Silylhydrazines", Inorganic Chemistry, May 1, 1967, vol. 6, No. 5, pp. 865-870.
Stewart et al., "Reactivity of Bis(2,2,5,5-tetramethyl-2,5-disila-1-azacyclopent-1-yl)tin with $CO_2$, OCS, and $CS_2$ and Comparison to That of Bis[bis(trimethylsilyl)amido]tin", Inorganic Chemistry, Nov. 9, 2010, vol. 49, No. 23, pp. 11133-11141.
Written Opinion of the International Searching Authority for PCT/JP2022/019510 (PCT/ISA/237) mailed on Jun. 28, 2022.

(Continued)

*Primary Examiner* — Yate' K Cutliff

(74) *Attorney, Agent, or Firm* — Birch, Stewart, Kolasch & Birch, LLP

(57) ABSTRACT

Provided is a method for efficiently producing an oxadisilacyclopentane compound at a high yield, comprising reacting an azadisilacyclopentane compound with water, the azadisilacyclopentane compound having the following general formula (1):

(1)

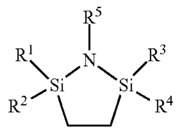

[$R^1$ to $R^4$ are each independently an unsubstituted monovalent hydrocarbon group having 1 to 4 carbon atoms, and $R^5$ is a hydrogen atom, a substituted or unsubstituted monovalent hydrocarbon group having 1 to 20 carbon atoms, or a group having the following general formula (2):

(2)

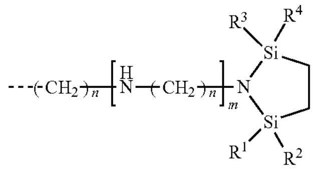

($R^1$ to $R^4$ are as defined above, m is an integer of 0 to 5, n is an integer of 1 to 5, and a broken line donates a valence bond.)

the oxadisilacyclopentane compound having the following general formula (3):

(3)

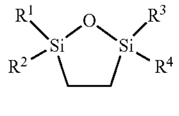

($R^1$ to $R^4$ are as defined above.).]

6 Claims, No Drawings

(56) References Cited

OTHER PUBLICATIONS

Basha et al., "1,2-Bis(chlorodimethylsilyl)ethane," In: "Encyclopedia of reagents for organics synthesis; vol. 7: Sod-Trim", Wiley, Chichester, XP093271337, Apr. 15, 2001, pp. 1-3.
Extended European Search Report for European Application No. 22811133.2, dated May 14, 2025.

* cited by examiner

METHOD FOR PRODUCING OXADISILACYCLOPENTANE COMPOUND

TECHNICAL FIELD

The present invention relates to a method for producing an oxadisilacyclopentane compound.

BACKGROUND ART

An oxadisilacyclopentane compound is useful as a starting compound for heat-resistant materials, electronic materials, optical materials, cosmetics, and the like.

Examples of the proposed method for producing an oxadisilacyclopentane compound include a method in which 1,2-bis(chlorodimethylsilyl)ethane obtained by a hydrosilylation reaction of chlorodimethylvinylsilane and chlorodimethylsilane is reacted with water and the resulting polymer compound is thermally decomposed (see Patent Document 1), a method in which 1,3-bis(chloromethyl)-1,1,3,3-tetramethyldisiloxane is reacted with magnesium (see Non-Patent Document 1), and a method in which bis(2,2,5,5-tetramethyl-1-aza-2,5-disilacyclopentyl) tin synthesized from 2,2,5,5-tetramethyl-1-aza-2,5-disilacyclopentane and tin (II) chloride are reacted with carbon dioxide and thus an oxadisilacyclopentane compound is obtained as a by-product in synthesis of a polynuclear complex of tin (see Non-Patent Document 2).

PRIOR ART DOCUMENTS

Patent Documents

Patent Document 1: JP-A H05-25182

Non-Patent Documents

Non-Patent Document 1: Pet. Chem. 56, 798 (2016)
Non-Patent Document 2: Inorg. Chem. 49, 11133 (2010)

SUMMARY OF INVENTION

Technical Problem

In the method disclosed in Patent Document 1, 2,2,5,5-tetramethyl-1-oxa-2,5-disilacyclopentane is formed by the reaction of 1,2-bis(chlorodimethylsilyl)ethane with water, and hydrogen chloride resulting from this reaction serves as a catalyst to promote a ring-opening reaction, leading to rapid formation of a polymer compound. Therefore, in order to obtain 2,2,5,5-tetramethyl-1-oxa-2,5-disilacyclopentane from this polymer compound, a thermal decomposition reaction is to be performed.

However, in order to obtain a desired oxadisilacyclopentane compound by thermal decomposition, the temperature is to be at least 200° C. or higher, and in order to obtain the desired product at a practical reaction rate, the temperature is to be 300° C. or higher. Thus, this method is not industrially advantageous because a large amount of energy is required in production.

In the method disclosed in Non-Patent Document 1, the reaction should be performed while magnesium is added as necessary in order to suppress a side reaction. Thus, this method is not industrially advantageous because of the complicated operation.

In the method disclosed in Non-Patent Document 2, not only a two-step reaction is required but also use of a tin compound which leads to be low in yield and high in toxicity is necessary to obtain a desired oxadisilacyclopentane compound, and thus this method is not industrially advantageous.

The present invention has been completed in view of the situation as described above. An object of the present invention is to provide a method which enables efficient and high-yield production of an oxadisilacyclopentane compound.

Solution to Problem

As a result of intensive studies to achieve the above object, the present inventors have found that an oxadisilacyclopentane compound can be obtained by reacting an azadisilacyclopentane compound with water without the need for a reaction at a high temperature and a complicated operation, and that in the method of obtaining an oxadisilacyclopentane compound in this manner, a reaction of forming a polymer compound due to a ring-opening reaction of the oxadisilacyclopentane compound in the reaction system is suppressed, and thus the present invention has been completed.

Accordingly, the present invention provides the method for producing an oxadisilacyclopentane compound as described below.

1. A method for producing an oxadisilacyclopentane compound, the method comprising reacting an azadisilacyclopentane compound with water, the azadisilacyclopentane compound having the following general formula (1):

[Chem. 1]

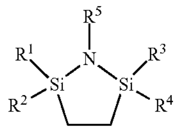

(1)

wherein $R^1$ to $R^4$ are each independently an unsubstituted monovalent hydrocarbon group having 1 to 4 carbon atoms, and $R^5$ is a hydrogen atom, a substituted or unsubstituted monovalent hydrocarbon group having 1 to 20 carbon atoms, or a group having the following general formula (2):

[Chem. 2]

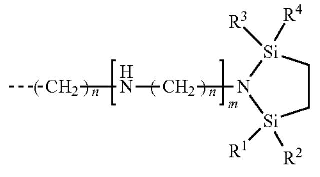

(2)

wherein $R^1$ to $R^4$ are as described above, m is an integer of 0 to 5, n is an integer of 1 to 5, and a broken line represents a valence bond, the oxadisilacyclopentane compound having the following general formula (3):

[Chem. 3]

(3)

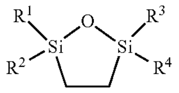

wherein $R^1$ to $R^4$ are as defined above.

2. The method for producing an oxadisilacyclopentane compound of the item 1, wherein an acid compound is used as a catalyst.
3. The method for producing an oxadisilacyclopentane compound of the item 2, wherein the acid compound is a carboxylic acid.
4. The method for producing an oxadisilacyclopentane compound of any one of the items 1 to 3, wherein a reaction temperature is 0 to 100° C.

Advantageous Effects of Invention

According to the present invention, an oxadisilacyclopentane compound which is useful as a starting compound for heat-resistant materials, electronic materials, optical materials, cosmetics, and the like can be efficiently produced in a good yield.

DESCRIPTION OF EMBODIMENTS

Hereinafter, the present invention is specifically described.

In the method for producing an oxadisilacyclopentane compound of the present invention, an azadisilacyclopentane compound having the following general formula (1) (hereinafter, referred to as "compound (1)") is reacted with water to obtain an oxadisilacyclopentane compound having the following general formula (3) (hereinafter, referred to as "compound (3)").

[Chem. 4]

(1)

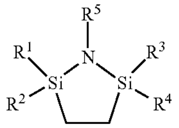

(3)

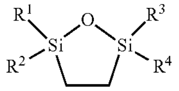

In the general formulas (1) and (3), $R^1$ to $R^4$ are each independently an unsubstituted monovalent hydrocarbon group having 1 to 4 carbon atoms.

Here, the unsubstituted monovalent hydrocarbon group having 1 to 4 carbon atoms represented by $R^1$ to $R^4$ may be linear, branched, or cyclic, and examples of which include alkyl and alkenyl groups.

Specific examples thereof include linear alkyl groups such as methyl, ethyl, n-propyl, and n-butyl groups; branched alkyl groups such as isopropyl, isobutyl, sec-butyl, and tert-butyl groups; cyclic alkyl groups such as cyclopropyl and cyclobutyl groups; and alkenyl groups such as vinyl, allyl, 1-propenyl, isopropenyl, and 1-butenyl groups.

Among these groups, alkyl groups having 1 to 3 carbon atoms are preferable, and methyl group and ethyl group are more preferable.

In the general formula (1), $R^5$ is a hydrogen atom, a substituted or unsubstituted monovalent hydrocarbon group having 1 to 20 carbon atoms, or a group having the following general formula (2).

[Chem. 5]

(2)

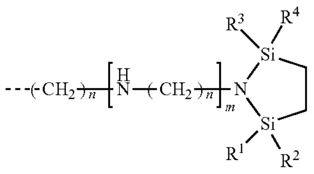

In the formula, $R^1$ to $R^4$ are as defined above, and the broken line denotes a valence bond.

Here, the substituted or unsubstituted monovalent hydrocarbon group having 1 to 20 carbon atoms represented by $R^5$ may be linear, branched, or cyclic, and examples of which include alkyl groups having 1 to 20, preferably 1 to 10, and more preferably 1 to 6 carbon atoms; alkenyl groups having 2 to 20, preferably 2 to 10, and more preferably 2 to 6 carbon atoms; aryl groups having 6 to 20, and preferably 6 to 10 carbon atoms; and aralkyl groups having 7 to 20, and preferably 7 to 10 carbon atoms.

Specific examples thereof include linear alkyl groups such as methyl, ethyl, n-propyl, n-butyl, n-pentyl, n-hexyl, n-heptyl, n-octyl, n-decyl, n-dodecyl, n-tetradecyl, n-hexadecyl, n-octadecyl, and n-icosyl groups; branched alkyl groups such as isopropyl, isobutyl, sec-butyl, tert-butyl, thexyl, and 2-ethylhexyl groups; cyclic alkyl groups such as cyclopentyl and cyclohexyl groups; alkenyl groups such as vinyl, allyl, 1-butenyl, and 1-pentenyl groups; aryl groups such as phenyl and tolyl groups; and aralkyl groups such as a benzyl group.

Some or all hydrogen atoms of the forgoing monovalent hydrocarbon groups may be substituted by other substituents. Specific examples of the substituents include alkoxy groups such as methoxy, ethoxy, and (n- or iso)propoxy groups; halogen atoms such as fluorine, chlorine, bromine, and iodine atoms; a cyano group; an amino group; and acyl groups having 2 to 10 carbon atoms.

Among these groups, the monovalent hydrocarbon group represented by $R^5$ is preferably alkyl group having 1 to 3 carbon atoms such as methyl, ethyl, or (n- or iso)propyl group, alkenyl group having 3 to 5 carbon atoms such as allyl, 1-butenyl, or 1-pentenyl group, or aryl group such as phenyl group, from the viewpoint of availability of the starting material and utility of the resulting product.

In the general formula (2), m is an integer of 0 to 5, preferably an integer of 0 to 2, and more preferably 0 or 1.

n is an integer of 1 to 5, preferably an integer of 1 to 4, and more preferably 2 or 3.

In a preferred combination of m and n, m is 0 or 1, and n is 2 or 3.

Specific examples of the group having the general formula (2) include (2,2,5,5-tetramethyl-1-aza-2,5-disilacyclopent-1-yl)ethyl,
(2,2,5,5-tetraethyl-1-aza-2,5-disilacyclopent-1-yl)ethyl,
(2,2,5,5-tetrapropyl-1-aza-2,5-disilacyclopent-1-yl)ethyl,
(2,2,5,5-tetraisopropyl-1-aza-2,5-disilacyclopent-1-yl)ethyl,
(2,2,5,5-tetrabutyl-1-aza-2,5-disilacyclopent-1-yl)ethyl, (2,2,5,5-tetramethyl-1-aza-2,5-disilacyclopent-1-yl)propyl,
(2,2,5,5-tetraethyl-1-aza-2,5-disilacyclopent-1-yl)propyl,
(2,2,5,5-tetrapropyl-1-aza-2,5-disilacyclopent-1-yl)propyl,
(2,2,5,5-tetraisopropyl-1-aza-2,5-disilacyclopent-1-yl)propyl,
(2,2,5,5-tetrabutyl-1-aza-2,5-disilacyclopent-1-yl)propyl,
(2,2,5,5-tetramethyl-1-aza-2,5-disilacyclopent-1-yl)ethylaminoethyl,
(2,2,5,5-tetraethyl-1-aza-2,5-disilacyclopent-1-yl)ethylaminoethyl,
(2,2,5,5-tetrapropyl-1-aza-2,5-disilacyclopent-1-yl)ethylaminoethyl,
(2,2,5,5-tetraisopropyl-1-aza-2,5-disilacyclopent-1-yl)ethylaminoethyl,
(2,2,5,5-tetrabutyl-1-aza-2,5-disilacyclopent-1-yl)ethylaminoethyl,
(2,2,5,5-tetramethyl-1-aza-2,5-disilacyclopent-1-yl)propylaminopropyl,
(2,2,5,5-tetraethyl-1-aza-2,5-disilacyclopent-1-yl)propylaminopropyl,
(2,2,5,5-tetrapropyl-1-aza-2,5-disilacyclopent-1-yl)propylaminopropyl,
(2,2,5,5-tetraisopropyl-1-aza-2,5-disilacyclopent-1-yl)propylaminopropyl, and
(2,2,5,5-tetrabutyl-1-aza-2,5-disilacyclopent-1-yl)propylaminopropyl groups.

Among these groups, the group having the general formula (2) represented by $R^5$ is preferably (2,2,5,5-tetramethyl-1-aza-2,5-disilacyclopent-1-yl)ethyl or (2,2,5,5-tetramethyl-1-aza-2,5-disilacyclopent-1-yl)ethylaminoethyl group from the viewpoint of availability of the starting material and utility of the resulting product.

In the general formula (1), $R^5$ is more preferably a hydrogen atom, or allyl, (2,2,5,5-tetramethyl-1-aza-2,5-disilacyclopent-1-yl)ethyl, or (2,2,5,5-tetramethyl-1-aza-2,5-disilacyclopent-1-yl)ethylaminoethyl group.

Specific examples of the compound (1) include
2,2,5,5-tetramethyl-1-aza-2,5-disilacyclopentane,
2,2,5,5-tetraethyl-1-aza-2,5-disilacyclopentane,
2,2,5,5-tetrapropyl-1-aza-2,5-disilacyclopentane,
2,2,5,5-tetraisopropyl-1-aza-2,5-disilacyclopentane,
2,2,5,5-tetrabutyl-1-aza-2,5-disilacyclopentane,
2,5-diethyl-2,5-dimethyl-1-aza-2,5-disilacyclopentane,
2,5-ditert-butyl-2,5-dimethyl-1-aza-2,5-disilacyclopentane,
1,2,2,5,5-pentamethyl-1-aza-2,5-disilacyclopentane,
1-methyl-2,2,5,5-tetraethyl-1-aza-2,5-disilacyclopentane,
1-methyl-2,2,5,5-tetrapropyl-1-aza-2,5-disilacyclopentane,
1-methyl-2,2,5,5-tetraisopropyl-1-aza-2,5-disilacyclopentane,
1-methyl-2,2,5,5-tetrabutyl-1-aza-2,5-disilacyclopentane,
2,5-diethyl-1,2,5-trimethyl-1-aza-2,5-disilacyclopentane,
2,5-ditert-butyl-1,2,5-dimethyl-1-aza-2,5-disilacyclopentane,
1-ethyl-2,2,5,5-tetramethyl-1-aza-2,5-disilacyclopentane,
1,2,2,5,5-pentaethyl-1-aza-2,5-disilacyclopentane,
1-ethyl-2,2,5,5-tetrapropyl-1-aza-2,5-disilacyclopentane,
1-ethyl-2,2,5,5-tetraisopropyl-1-aza-2,5-disilacyclopentane,
1-ethyl-2,2,5,5-tetrabutyl-1-aza-2,5-disilacyclopentane,
1-ethyl-2,5-diethyl-2,5-dimethyl-1-aza-2,5-disilacyclopentane,
1-ethyl-2,5-ditert-butyl-2,5-dimethyl-1-aza-2,5-disilacyclopentane,
1-allyl-2,2,5,5-tetramethyl-1-aza-2,5-disilacyclopentane,
1-allyl-2,2,5,5-tetraethyl-1-aza-2,5-disilacyclopentane,
1-allyl-2,2,5,5-tetrapropyl-1-aza-2,5-disilacyclopentane,
1-allyl-2,2,5,5-tetraisopropyl-1-aza-2,5-disilacyclopentane,
1-allyl-2,2,5,5-tetrabutyl-1-aza-2,5-disilacyclopentane,
1-allyl-2,5-diethyl-2,5-dimethyl-1-aza-2,5-disilacyclopentane,
1-allyl-2,5-ditert-butyl-2,5-dimethyl-1-aza-2,5-disilacyclopentane,
1-phenyl-2,2,5,5-tetramethyl-1-aza-2,5-disilacyclopentane,
1-phenyl-2,2,5,5-tetraethyl-1-aza-2,5-disilacyclopentane,
1-phenyl-2,2,5,5-tetrapropyl-1-aza-2,5-disilacyclopentane,
1-phenyl-2,2,5,5-tetraisopropyl-1-aza-2,5-disilacyclopentane,
1-phenyl-2,2,5,5-tetrabutyl-1-aza-2,5-disilacyclopentane,
1-phenyl-2,5-diethyl-2,5-dimethyl-1-aza-2,5-disilacyclopentane,
1-phenyl-2,5-ditert-butyl-2,5-dimethyl-1-aza-2,5-disilacyclopentane,
1,1'-(1,2-ethanediyl)bis(2,2,5,5-tetramethyl-1-aza-2,5-disilacyclopentane), and
bis[(2,2,5,5-tetramethyl-1-aza-2,5-disilacyclopent-1-yl)ethyl]amine.

Among them, 2,2,5,5-tetramethyl-1-aza-2,5-disilacyclopentane, 1-allyl-2,2,5,5-tetramethyl-1-aza-2,5-disilacyclopentane, 1,1'-(1,2-ethanediyl)bis(2,2,5,5-tetramethyl-1-aza-2,5-disilacyclopentane), and bis[(2,2,5,5-tetramethyl-1-aza-2,5-disilacyclopent-1-yl)ethyl]amine are preferable from the viewpoint of availability of the starting material and utility of the resulting product. These compounds may be acquired as a commercial product or may be synthesized. In the case of synthesizing, the compound may be synthesized by a known method. For example, the compound can be obtained by a method of reacting a primary amine compound with a 1,2-bis(chlorosilyl)ethane compound.

The blend ratio of the compound (1) and water is not particularly limited, and the amount of water is preferably 0.5 to 50.0 moles, and more preferably 0.8 to 20.0 moles per mole of the azadisilacyclopentane site of the compound (1) from the viewpoint of the reactivity and the productivity.

The above-described reaction proceeds without using a catalyst, but a catalyst can be used for the purpose of improving the reaction rate.

The catalyst to be used is preferably an acid compound, and specific examples of which include inorganic acids such as hydrochloric acid, sulfuric acid, and nitric acid; sulfonic acid compounds such as methanesulfonic acid, benzenesulfonic acid, p-toluenesulfonic acid, dodecylbenzenesulfonic acid, and trifluoromethanesulfonic acid; carboxylic acids such as acetic acid, propionic acid, butyric acid, malonic acid, succinic acid, maleic acid, benzoic acid, and phthalic acid; salts of the above-described acids; and Lewis acid compounds such as aluminum chloride, zinc chloride, and titanium tetrachloride.

Among them, carboxylic acids are preferable, and acetic acid is more preferable.

In the case of using a catalyst, the amount of the catalyst to be used is not particularly limited, and is preferably 0.0001 to 0.5 moles, and more preferably 0.001 to 0.2 moles per mole of the compound (1) from the viewpoint of the reactivity and the productivity.

The above-described reaction can be carried out without using a solvent.

In this case, the compound (1) may be added to water, or water may be added to the compound (1). From the viewpoint of improving the reaction rate, a method of adding the compound (1) to water is preferable, and a method of adding the compound (1) dropwise to water is more preferable. In the case of using an acid compound as the catalyst, the acid compound is preferably used in a mixture with water.

The above-described reaction can also be carried out using a solvent.

Any solvent may be used as long as it does not inhibit the reaction. Specific examples of which include hydrocarbon solvents such as pentane, hexane, cyclohexane, heptane, isooctane, benzene, toluene, and xylene; ether solvents such as diethyl ether, tetrahydrofuran, dioxane, ethylene glycol dimethyl ether, ethylene glycol diethyl ether, diethylene glycol dimethyl ether, diethylene glycol diethyl ether, dipropylene glycol dimethyl ether, and dipropylene glycol diethyl ether; ester solvents such as ethyl acetate, butyl acetate, and propylene glycol monomethyl ether acetate; aprotic polar solvents such as acetonitrile, N,N-dimethylformamide, N-methylpyrrolidone, and dimethyl sulfoxide; chlorinated hydrocarbon solvents such as dichloromethane and chloroform; and alcohol solvents such as methanol and ethanol. These solvents may be used alone or in combination of two or more.

Among them, ether solvents, ester solvents, and aprotic polar solvents are preferable from the viewpoint of improving the compatibility with water to enhance the reaction rate.

In the case of using a solvent, the compound (1), water, and the solvent may be blended in any order. It is preferable to mix a mixture of the compound (1) and the solvent with water. It is more preferable to add water to the mixture of the compound (1) and the solvent, and still more preferable to add water dropwise to the above mixture. In this case, water may be used in the form of a mixture with the solvent. The mixing ratio of water and the solvent is not particularly limited, and the weight ratio of water/solvent is preferably 1/0.5 to 1/5. In the case of using a catalyst, it may be added to the mixture of the compound (1) and the solvent, or may be added to water.

The reaction temperature of the above-described reaction is not particularly limited, and is preferably 0 to 100° C., more preferably 15 to 85° C., even more preferably 20 to 80° C., and still more preferably 20 to 70° C.

The reaction time is also not particularly limited, and is preferably 1 to 15 hours, more preferably 1 to 10 hours, even more preferably 1 to 7 hours, and still more preferably 1 to 5 hours.

The reaction may be carried out in the atmosphere of air or inert gas such as nitrogen or argon.

The reaction of the compound (1) with water irreversibly proceeds under mild conditions, and the compound (1) is converted into the desired compound (3). In the method of obtaining the compound (3) in this manner, a reaction of forming a polymer compound due to a ring-opening reaction of the compound (1) in the reaction system is suppressed. Therefore, this method is more advantageous than a conventional method in which a polymer compound formed by reacting 1,2-bis(chlorodimethylsilyl)ethane with water is thermally decomposed and thus a reaction at a high temperature is required.

A desired product can be obtained from the reaction liquid thus obtained by carrying out a liquid separation as necessary and performing an ordinary method such as usual distillation or distillation of a low-boiling compound.

EXAMPLES

Hereinafter, the present invention is more specifically described with reference to Examples and Comparative Examples, but the present invention is not limited to the following Examples.

Example 1

In a flask equipped with a stirrer, a reflux condenser, a dropping funnel, and a thermometer, 200 g (11.1 mole) of water and 2.0 g (0.03 mole) of acetic acid were placed, 159.4 g (1.0 mole) of 2,2,5,5-tetramethyl-1-aza-2,5-disilacyclopentane was added dropwise at 25 to 35° C. in 30 minutes, and the stirring was continued for 3 hours at the same temperature. After the reaction, the lower layer was removed from the resulting two separated layers, and the upper layer was distilled off. 105.8 g of a fraction of 2,2,5,5-tetramethyl-1-oxa-2,5-disilacyclopentane having a boiling point of 49-50° C./6.0 kPa was obtained (yield: 66%).

Example 2

In a flask equipped with a stirrer, a reflux condenser, a dropping funnel, and a thermometer, 159.4 g (1.0 mole) of 2,2,5,5-tetramethyl-1-aza-2,5-disilacyclopentane and 400 g of dipropylene glycol dimethyl ether were placed, 22.5 g (1.25 mole) of water was added dropwise at 45 to 55° C. in 30 minutes, and the stirring was continued for 2 hours at the same temperature. The reaction liquid was distilled off to obtain 115.3 g of a fraction of 2,2,5,5-tetramethyl-1-oxa-2,5-disilacyclopentane having a boiling point of 49-50° C./6.0 kPa (yield: 72%).

Example 3

In a flask equipped with a stirrer, a reflux condenser, a dropping funnel, and a thermometer, 159.4 g (1.0 mole) of 2,2,5,5-tetramethyl-1-aza-2,5-disilacyclopentane and 350 g of tetrahydrofuran were placed, 18.9 g (1.05 mole) of water was added dropwise at 45 to 55° C. in 2 hours, and the stirring was continued for 2 hours at the same temperature. The reaction liquid was distilled off to obtain 132.0 g of a fraction of 2,2,5,5-tetramethyl-1-oxa-2,5-disilacyclopentane having a boiling point of 49-50° C./6.0 kPa (yield: 82%).

Example 4

In a flask equipped with a stirrer, a reflux condenser, a dropping funnel, and a thermometer, 199.4 g (1.0 mole) of 1-allyl-2,2,5,5-tetramethyl-1-aza-2,5-disilacyclopentane and 400 g of tetrahydrofuran were placed, a mixture of 36.0 g (1.5 mole) of water and 36.0 g of tetrahydrofuran was added dropwise at 45 to 55° C. in 8 hours, and the stirring was continued for 2 hours at the same temperature. The reaction liquid was distilled off to obtain 110.5 g of a fraction of 2,2,5,5-tetramethyl-1-oxa-2,5-disilacyclopentane having a boiling point of 49-50° C./6.0 kPa (yield: 69%).

Example 5

In a flask equipped with a stirrer, a reflux condenser, a dropping funnel, and a thermometer, 172.4 g (0.5 mole) of 1,1'-(1,2-ethanediyl)bis(2,2,5,5-tetramethyl-1-aza-2,5-disilacyclopentane) and 400 g of tetrahydrofuran were placed, a mixture of 36.0 g (1.5 mole) of water and 36.0 g of tetrahydrofuran was added dropwise at 65 to 75° C. in 8 hours, and the stirring was continued for 2 hours at the same temperature. The reaction liquid was distilled off to obtain 114.5 g of a fraction of 2,2,5,5-tetramethyl-1-oxa-2,5-disilacyclopentane having a boiling point of 49-50° C./6.0 kPa (yield: 71%).

Example 6

In a flask equipped with a stirrer, a reflux condenser, a dropping funnel, and a thermometer, 194.0 g (0.5 mole) of bis[(2,2,5,5-tetramethyl-1-aza-2,5-disilacyclopent-1-yl)

ethyl]amine and 400 g of tetrahydrofuran were placed, a mixture of 36.0 g (1.5 mole) of water and 36.0 g of tetrahydrofuran was added dropwise at 65 to 75° C. in 8 hours, and the stirring was continued for 2 hours at the same temperature. The reaction liquid was distilled off to obtain 128.8 g of a fraction of 2,2,5,5-tetramethyl-1-oxa-2,5-disilacyclopentane having a boiling point of 49-50° C./6.0 kPa (yield: 80%).

Comparative Example 1

In a flask equipped with a stirrer, a reflux condenser, a dropping funnel, and a thermometer, 215.3 g (1.0 mole) of 1,2-bis(chlorodimethylsilyl)ethane was placed, 900 g (50.0 mole) of water was added dropwise at 50 to 60° ° C. in 1 hour, and the stirring was continued for 1 hour at the same temperature. After the reaction, the lower layer was removed from the resulting two separated layers. 6.4 g of a 50 wt % aqueous potassium hydroxide solution was added to the upper layer, and the resulting polymer compound was subjected to a thermal decomposition reaction. Formation of the desired 2,2,5,5-tetramethyl-1-oxa-2,5-disilacyclopentane was confirmed after the inner temperature reached at 250° C. or higher. After reaction at 370° ° C. for 5 hours, distillation was carried out. 78.3 g of a fraction of 2,2,5,5-tetramethyl-1-oxa-2,5-disilacyclopentane having a boiling point of 49-50° C./6.0 kPa was obtained (yield: 49%).

The invention claimed is:

1. A method for producing an oxadisilacyclopentane compound, the method comprising reacting an azadisilacyclopentane compound with water, the azadisilacyclopentane compound having the following general formula (1):

[Chem. 1]

(1)

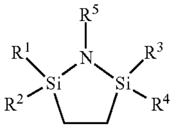

wherein $R^1$ to $R^4$ are each independently an unsubstituted monovalent hydrocarbon group having 1 to 4 carbon atoms, and $R^5$ is a hydrogen atom, a substituted or unsubstituted monovalent hydrocarbon group having 1 to 20 carbon atoms, or a group having the following general formula (2):

[Chem. 2]

(2)

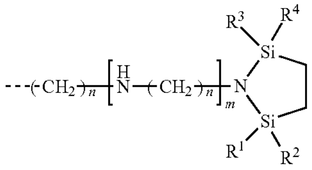

wherein $R^1$ to $R^4$ are as defined above, m is an integer of 0 to 5, n is an integer of 1 to 5, and a broken line donates a valence bond, the oxadisilacyclopentane compound having the following general formula (3):

[Chem. 3]

(3)

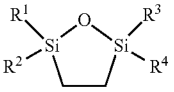

wherein $R^1$ to $R^4$ are as defined above.

2. The method for producing an oxadisilacyclopentane compound of claim 1, wherein an acid compound is used as a catalyst.

3. The method for producing an oxadisilacyclopentane compound of claim 2, wherein the acid compound is a carboxylic acid.

4. The method for producing an oxadisilacyclopentane compound of claim 1, wherein a reaction temperature is 0 to 100° C.

5. The method for producing an oxadisilacyclopentane compound of claim 2, wherein a reaction temperature is 0 to 100° C.

6. The method for producing an oxadisilacyclopentane compound of claim 3, wherein a reaction temperature is 0 to 100° C.

* * * * *